United States Patent
Nguyen et al.

(10) Patent No.: US 9,303,779 B2
(45) Date of Patent: Apr. 5, 2016

(54) SLAM SHUT SAFETY DEVICE WITH GUIDED PLUG SUPPORT

(71) Applicant: EMERSON PROCESS MANAGEMENT REGULATOR TECHNOLOGIES, INC., McKinney, TX (US)

(72) Inventors: Tung Kim Nguyen, McKinney, TX (US); Cristian-Tiberiu Moldovan, Cluj-Napoca (RO); Roman Alexandru-Vlad, Cluj-Napoca (RO); Stanley D. Hall, Frisco, TX (US); Michel Bouvry, Champhol (FR); David E. Woollums, Frisco, TX (US)

(73) Assignee: EMERSON PROCESS MANAGEMENT REGULATOR TECHNOLOGIES, INC., McKinney, TX (US)

( * ) Notice: Subject to any disclaimer, the term of this patent is extended or adjusted under 35 U.S.C. 154(b) by 173 days.

(21) Appl. No.: 14/039,139

(22) Filed: Sep. 27, 2013

(65) Prior Publication Data
US 2014/0083525 A1    Mar. 27, 2014

Related U.S. Application Data

(60) Provisional application No. 61/706,194, filed on Sep. 27, 2012.

(51) Int. Cl.
*F16K 17/00* (2006.01)
*F16K 17/164* (2006.01)
(Continued)

(52) U.S. Cl.
CPC .......... *F16K 17/164* (2013.01); *F16K 1/36* (2013.01); *F16K 1/48* (2013.01); *F16K 1/487* (2013.01); *Y10T 137/7723* (2015.04)

(58) Field of Classification Search
CPC ......... F16K 17/164; F16K 17/10; F16K 1/48; F16K 1/36

USPC ............. 137/456, 463, 543.21, 543.23
See application file for complete search history.

(56) References Cited

U.S. PATENT DOCUMENTS 1,696,452 A * 12/1928 Fairfield .................. 137/477
3,092,133 A *  6/1963 Clark ...................... 137/220
(Continued)

FOREIGN PATENT DOCUMENTS

FR       1 167 362 A    11/1958

OTHER PUBLICATIONS

International Search Report and Written Opinion for Application No. PCT/US2013/061790, dated Dec. 11, 2013.
(Continued)

*Primary Examiner* — Marina Tietjen
*Assistant Examiner* — Umashankar Venkatesan
(74) *Attorney, Agent, or Firm* — Marshall, Gerstein & Borun LLP

(57) ABSTRACT

A slam-shut safety device includes a valve body, a valve disc, a reset pin, a and a guide collar. The valve disc is shiftable between an open position spaced away from a valve seat, and a closed position seated against the valve seat. The reset pin operatively is coupled to the valve disc and shiftable between an untripped position placing the valve disc in the open position and a tripped position placing the valve disc in the closed position. The guide collar includes a hollow cylindrical portion slidably supported in a guide bore and extending at least partly over the reset pin at a location adjacent to the valve disc. The guide collar is shiftable between a retracted position and an extended position relative to the guide bore for providing added structural integrity and protecting the reset pin from bending forces.

19 Claims, 6 Drawing Sheets

(51) Int. Cl.
 *F16K 1/36* (2006.01)
 *F16K 1/48* (2006.01)

(56) References Cited

U.S. PATENT DOCUMENTS

| | | | | |
|---|---|---|---|---|
| 3,211,174 A | * | 10/1965 | Weise et al. | 137/469 |
| 3,595,263 A | * | 7/1971 | Greenlaw | 137/451 |
| 3,722,860 A | * | 3/1973 | Curran | 251/332 |
| 3,765,447 A | * | 10/1973 | Cornell | 137/538 |
| 3,913,885 A | * | 10/1975 | Greenwood et al. | 251/63 |
| 4,295,489 A | * | 10/1981 | Arends et al. | 137/488 |
| 4,421,298 A | | 12/1983 | Kujawski | |
| 4,462,420 A | * | 7/1984 | Cullie | 137/488 |
| 5,082,239 A | * | 1/1992 | Feild | 251/120 |
| 6,318,406 B1 | * | 11/2001 | Conley | 137/491 |
| 8,225,812 B2 | | 7/2012 | Faillat et al. | |
| 8,312,893 B2 | * | 11/2012 | Bey et al. | 137/625.38 |
| 2004/0089347 A1 | * | 5/2004 | Cavagna | 137/491 |
| 2011/0240128 A1 | * | 10/2011 | Barbato et al. | 137/1 |
| 2011/0284102 A1 | | 11/2011 | Schneider | |
| 2014/0166139 A1 | * | 6/2014 | Watanabe et al. | 137/625.35 |

OTHER PUBLICATIONS

International Search Report and Written Opinion for Application No. PCT/US2013/061788, dated Dec. 11, 2013.

\* cited by examiner

SLAM SHUT SAFETY DEVICE WITH GUIDED PLUG SUPPORT

CROSS-REFERENCE TO RELATED APPLICATIONS

This application claims the benefit of U.S. Provisional Application No. 61/706,194, filed Sep. 27, 2012, which is incorporated by reference herein.

FIELD OF THE DISCLOSURE

The present disclosure generally relates to fluid control components for gas distribution systems and, more particularly, to slam-shut safety devices for gas distribution systems.

BACKGROUND

Gas distribution systems, such as systems used to distribute natural gas, typically transport gas from a producer to a consumer along a series of pipes and through a series of valves. Each gas distribution system may include one or more regulator valves that control the pressure of the gas within the distribution system. Normally, the gas is transmitted at a high pressure through the system. However, the pressure of the gas must be reduced prior to final distribution to the consumers. This pressure reduction is typically accomplished at pressure reducing stations within local networks.

Typically, these pressure reducing stations include one or more pressure regulating valves and some sort of safety device to shut off the flow of gas should the pressure regulating valve fail. Most commonly, slam-shut safety valves are used for this purpose. For example, U.S. Pat. No. 4,134,421, which is hereby incorporated by reference, discloses a slam-shut safety valve that provides overpressure protection in a pipeline. Another example of a slam-shut safety valve is disclosed in U.S. Pat. No. 8,225,812, which also is incorporated by reference herein. The slam-shut safety valve is generally disposed upstream of the pressure regulating valve so that the slam-shut valve may prevent gas from reaching the pressure regulating valve in the event of the pressure regulating valve has failed. The slam-shut safety valve monitors gas pressure downstream of the pressure regulating valve for maximum and minimum pressure tolerances. If the downstream pressure exceeds either the maximum or minimum tolerance, the slam-shut safety valve closes, cutting off the flow of gas to the pressure regulating valve and preventing an uncontrolled leak of gas due to the pressure regulating valve failure.

Known slam-shut safety valves have a valve disc that covers a valve orifice in the vicinity of a valve seat when an overpressure or underpressure condition is sensed. The valve disc is coupled to a reset pin, and the reset pin in turn is attached to an actuator that senses the overpressure or underpressure condition. The reset pin is typically in the open or untripped position, which places the valve disc away from the valve seat in an open position. Should the actuator sense the appropriate trip condition, the actuator releases the reset pin, and the valve disc shifts to the closed position against the valve seat.

In conventional slam-shut devices, the reset pin is exposed to the flow of fluid. Moreover, in certain flow conditions, such as relatively high flow conditions, forces generated by the fluid flow can impact the proper operation of the reset pin, as well as even deform (e.g., bend) the reset pin.

SUMMARY

One aspect of the present disclosure provides a slam-shut safety device including a valve body, a valve disc, a reset pin, a plug support, and a guide collar. The valve body has an inlet, an outlet, and defines a flow path extending between the inlet and the outlet. The valve body further includes a valve seat surrounding an orifice disposed between the inlet and the outlet. The valve disc is disposed within the valve body and is shiftable along a slam-shut axis between an open first position in which the valve disc is spaced away from the valve seat, and a closed second position in which the valve disc is seated against the valve seat. The reset pin is operatively coupled to the valve disc and shiftable along the slam-shut axis relative to the valve body between an untripped position placing the valve disc in the open first position and a tripped position placing the valve disc in the closed second position. The reset pin is arranged to respond to an actuator to shift the reset pin from the untripped position toward the tripped position. The plug support is connected between the valve disc and the reset pin. The guide collar is connected to the plug support and includes a hollow cylindrical portion extending at least partly over the reset pin at a location adjacent to the valve disc. The guide collar is slidably disposed in a guide bore of a slam shut body that is connected to the valve body and supporting the reset pin. The guide collar is shiftable along the slam-shut axis between a retracted position, wherein a majority of the guide collar is disposed inside of the guide bore when the valve disc is in the open position, and an extended position, wherein the majority of the guide collar is disposed outside of the guide bore when the valve disc is in the closed position. So configured, the guide collar is in contact with an inner wall of the guide bore for providing added structural integrity.

Another aspect of the present disclosure provides a slam-shut safety device including a slam shut body, a reset pin, a valve disc, a plug support, and a guide collar. The slam shut body includes a throat portion adapted to be connected to a valve body. The reset pin is supported by the slam-shut body and extends out of the throat portion. The reset pin is shiftable along the slam-shut axis between an untripped position retracted into the slam-shut body and a tripped position extended out of the slam-shut body relative to the retracted position. The reset pin is arranged to respond to an actuator to shift the reset pin from the untripped position toward the tripped position. The valve disc is operatively coupled to an end of the reset pin outside of the throat of the slam-shut body and adapted to be disposed within the valve body when the slam-shut body is connected to the valve body. The valve disc is shiftable along the slam-shut axis between an open first position when the reset pin is in the untripped position, and a closed second position when the reset pin is in the tripped position. The plug support is connected between the valve disc and the reset pin. The guide collar is connected to the plug support and includes a hollow cylindrical portion extending at least partly over the reset pin at a location adjacent to the valve disc. The guide collar is slidably supported by a guide bore defined by the throat portion of the slam shut body. The guide collar is shiftable along the slam-shut axis between a retracted position, wherein a majority of the guide collar is disposed inside of the guide bore when the reset pin is in the untripped position, and an extended position, wherein the majority of the guide collar is disposed outside of the guide bore when the reset pin is in the tripped position. So configured, the guide collar is in contact with an inner wall of the guide bore for providing added structural integrity.

A still further aspect of the present disclosure provide a slam-shut safety device including a valve body with an inlet, an outlet, and defining a flow path extending between the inlet and the outlet. The valve body includes a valve seat surrounding an orifice disposed between the inlet and the outlet. The device can further include a valve disc disposed within the valve body and shiftable along a slam-shut axis between an open first position in which the valve disc is spaced away from the valve seat, and a closed second position in which the valve disc is seated against the valve seat. Additionally, the device can include a reset pin operatively coupled to the valve disc and shiftable along the slam-shut axis relative to the valve body between an untripped position placing the valve disc in the open first position and a tripped position placing the valve disc in the closed second position. The reset pin is arranged to respond to an actuator to shift the reset pin from the untripped position toward the tripped position. Further, the device includes a plug support connected between the valve disc and the reset pin. Further still, the device includes a means for protecting the reset pin against detrimental effects of fluid forces generated in the valve body adjacent to the valve disc.

DETAILED DESCRIPTION

Figure 1:
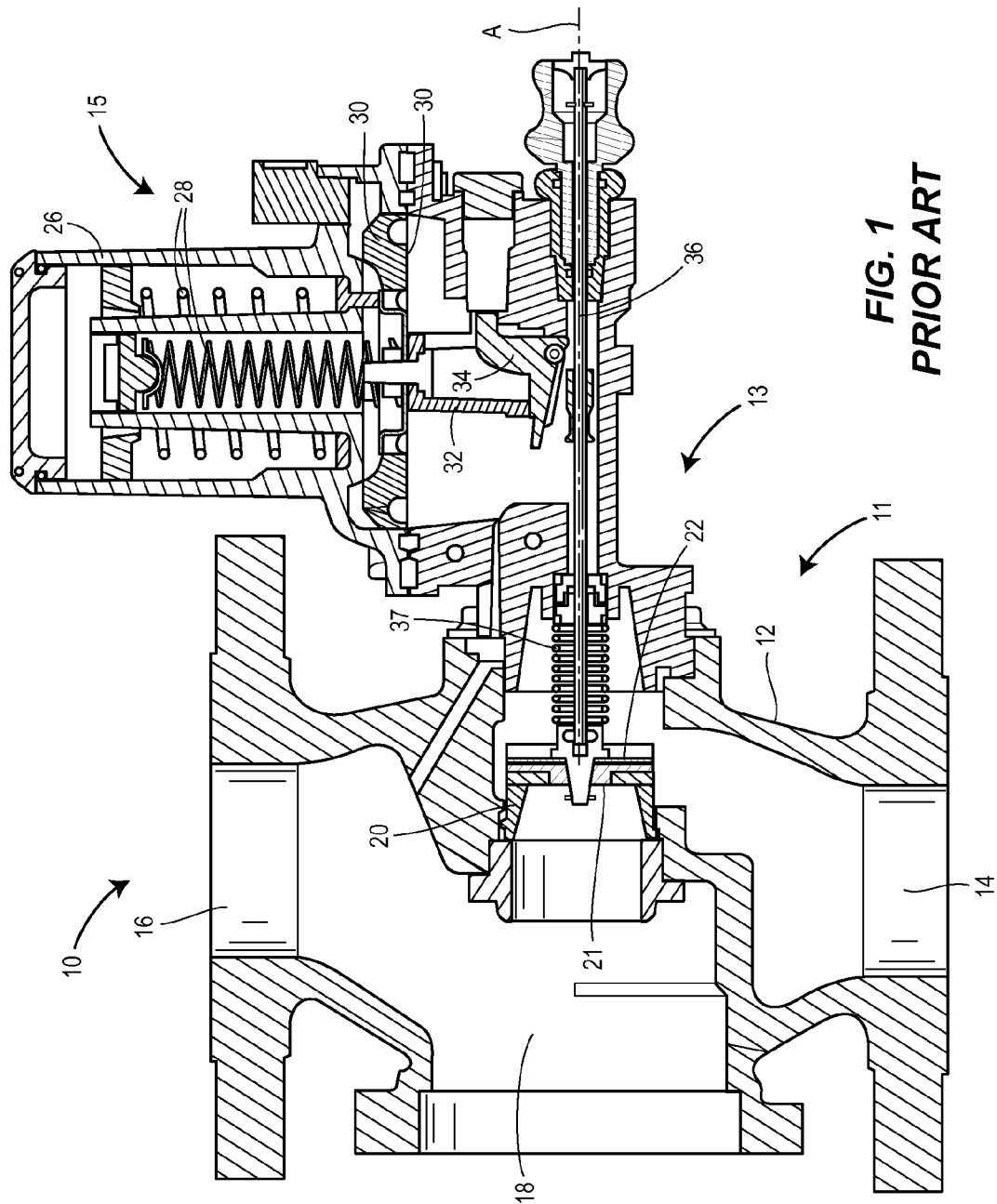
FIG. 1 is a cross-sectional view of a prior art slam-shut safety valve and showing the valve disc in a closed position.
Figure 2:
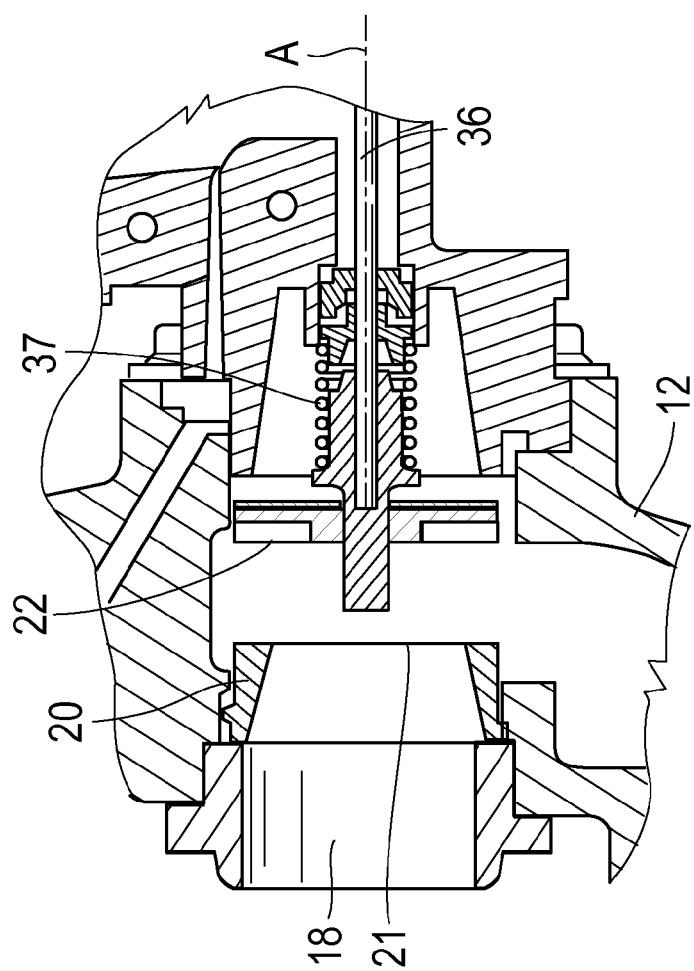
FIG. 2 is an enlarged cutaway view of the slam-shut safety valve of FIG. 1, showing the valve disc in an open position.

Turning now to the drawings, FIGS. 1 and 2 illustrate one example of a known slam-shut safety device 10. The slam-shut safety device 10 may be attached to a main regulator (not shown) in a gas distribution system to provide a safety shutoff capability in the event of main regulator failure. The slam-shut safety device 10 includes a valve portion 11, a slam-shut portion 13, and an actuator 15. The valve portion 11 includes a valve body 12 having a fluid inlet 14, and a fluid outlet 16 connected by a fluid passage forming a flow path 18. A valve seat 20 is disposed within the valve body 12 and defines a flow orifice 21 forming a portion of the flow path 18. Consequently, fluid flowing through the slam-shut safety device 10 flows from the fluid inlet 14, through the flow path 18 including the valve seat 20 (and the flow orifice 21 formed by the valve seat 20) to the fluid outlet 16.

The slam-shut portion 13 includes a valve disc 22 that cooperates with the valve seat 20 to restrict fluid flow through the valve body 12 when an overpressure or underpressure condition is sensed downstream of the main regulator. The valve disc 22 slides within the valve body 12 toward the valve seat 20 in order to close the fluid orifice 21, and away from the valve seat 20 in order to open the fluid orifice 21. Typically, the actuator 15 includes a housing 26 enclosing one or more springs 28, and the springs 28 are typically connected to a diaphragm 30. The diaphragm 30 is sensitive to pressure changes within the actuator 15 and moves within the actuator housing 26 in response to pressure changes. The diaphragm 30 is connected to a back plate 32, which moves longitudinally within the housing 26 in conjunction with the diaphragm 30. The back plate 32 interacts with a cam 34 to engage or release a reset pin 36. The reset pin 36 is shiftable along a slam-shut axis A relative to the valve body 12 between a retracted or untripped position in which the valve disc 22 is spaced away from the valve seat 20 in an open position opening the flow orifice 21, and an extended or tripped position in which the valve disc 22 is seated against the valve seat 20 in a closed position closing the flow orifice 21.

The slam-shut portion includes a spring 37 or other suitable biasing mechanism, which acts to bias the valve disc 22 toward the closed position. Consequently, the reset pin 36 is shiftable between the untripped position and the tripped position when the actuator 15 senses either an overpressure condition or an underpressure condition. The actuator 15 causes the cam 34 to release the reset pin 36, such that the spring 37 causes the reset pin 36 and hence the valve disc 22 to slide toward the valve seat 20, ultimately bringing the valve disc 22 into contact with the valve seat 20, thus closing the flow orifice 21 and shutting off fluid flow through the flow path 18 in the valve body 12.

FIG. 2 illustrates a close up view of the slam-shut portion 13 of the slam-shut safety device 10. The reset pin 36 is shown connected to the valve disc 22, with the reset pin 36 disposed in the untripped position placing the valve disc 22 in the open position spaced away from the valve seat 20. The reset pin 36, when positioned in the untripped position, may be held in place by the cam 34 or other suitable latching mechanism, such that the cam 34 releasably holds the reset pin 36 in the untripped position (which can also be referred to as the armed position) with the valve disc 22 is spaced away from the valve seat 20. When the cam 34 is activated by the actuator 15, the cam 34 releases the reset pin 36, and the valve disc 22 slides or otherwise shifts toward the valve seat 20 to close the slam-shut safety device 10, preventing fluid flow through the flow path 18 of the valve body 12.

Figure 3:
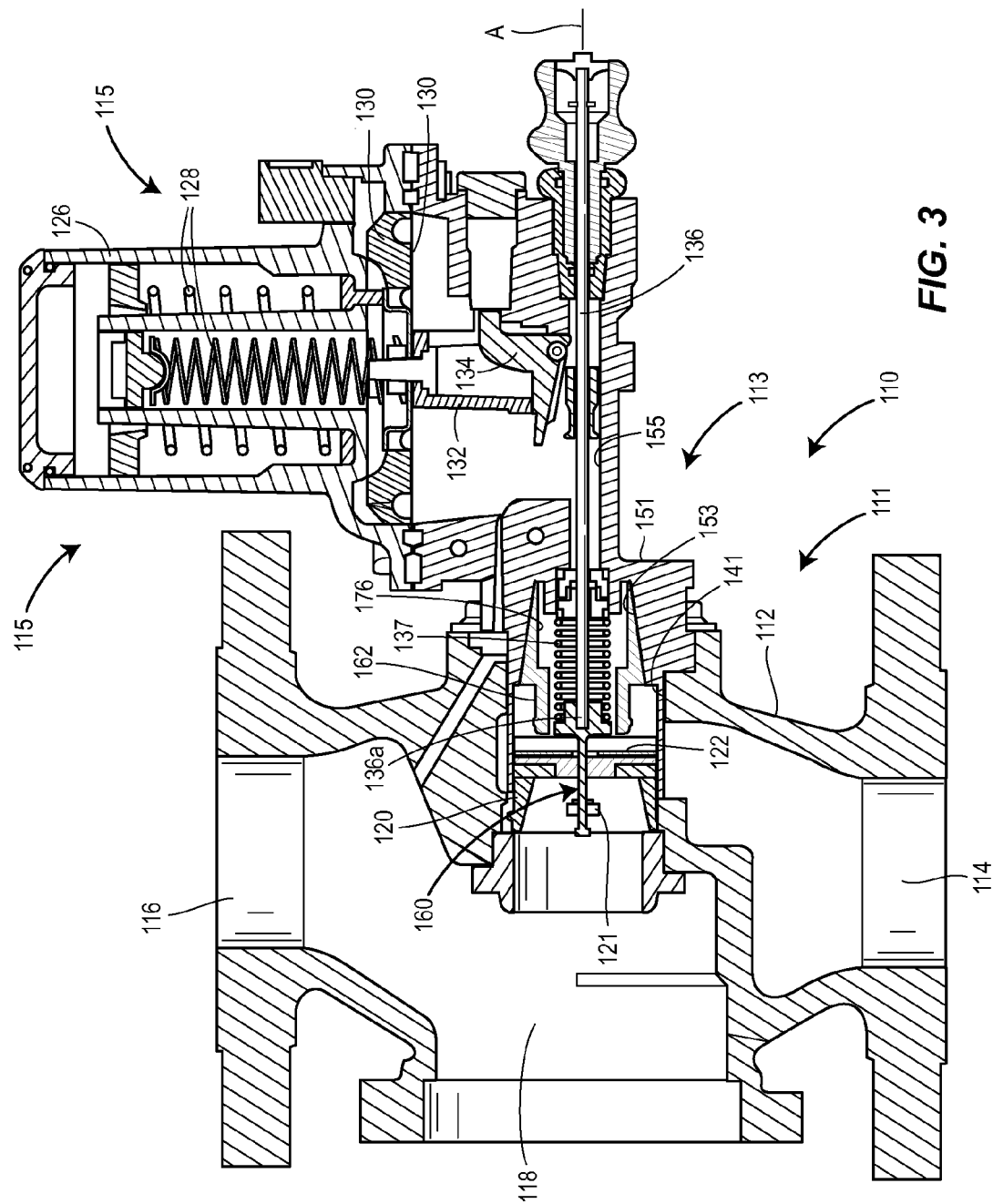
FIG. 3 is a cross-sectional side view of a slam-shut safety valve constructed in accordance with the teachings of the present disclosure and incorporating an arrestor spring operatively coupling the valve disc to the valve disc support.
Figure 4:
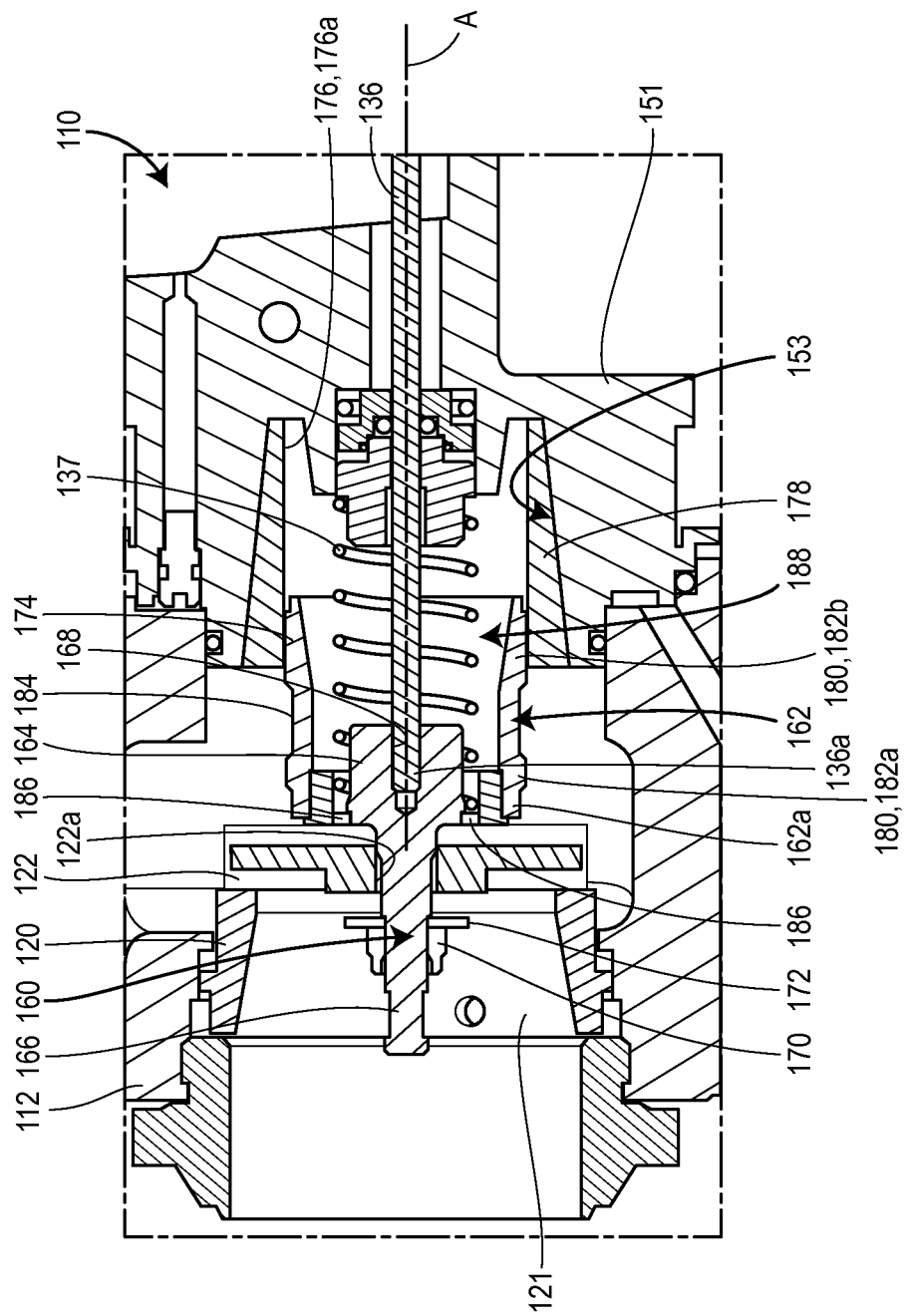
FIG. 4 is an enlarged cutaway view of the slam-shut safety valve of FIG. 3, showing the valve disc in a closed position.
Figure 5:
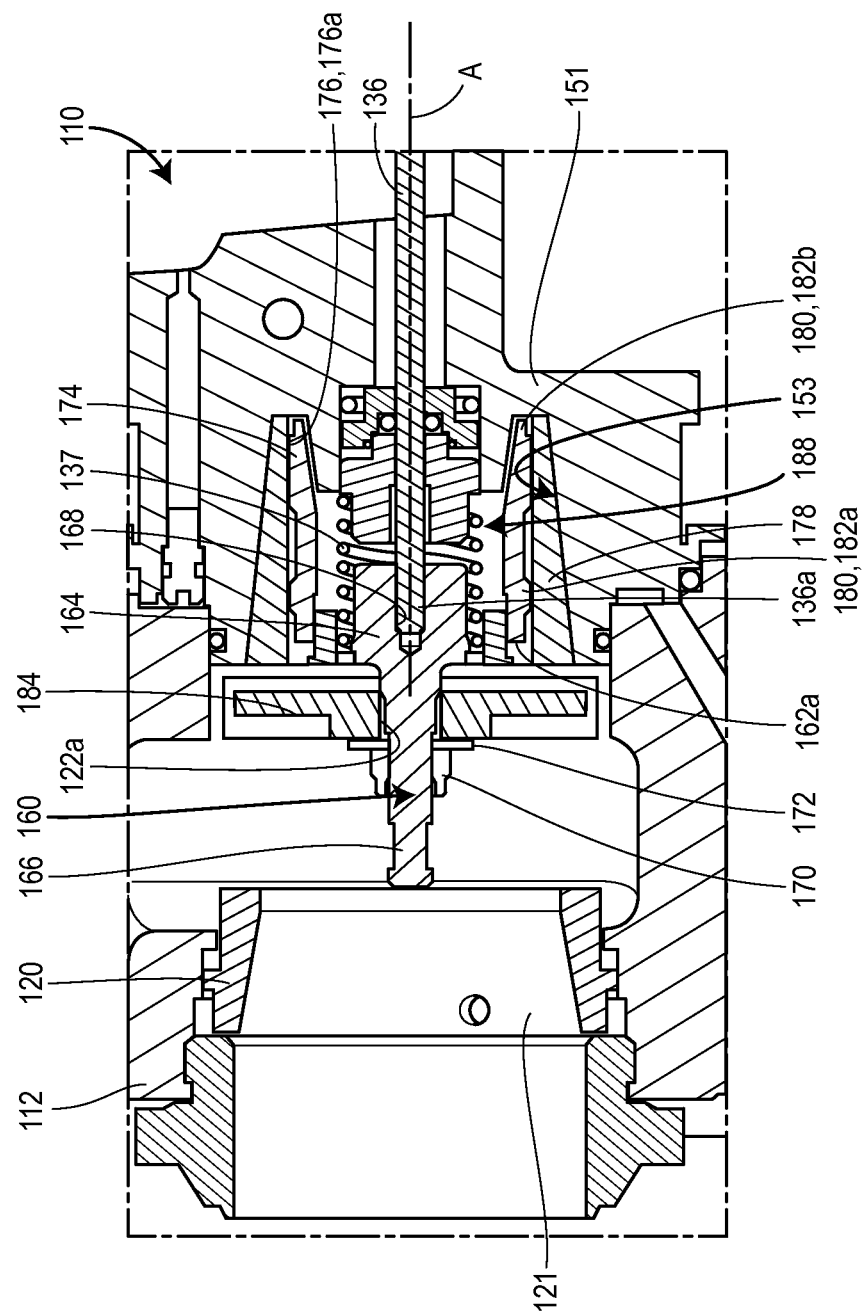
FIG. 5 is an enlarged cutaway view of the slam-shut safety valve of FIG. 3, showing the valve disc in an open position.

Referring now to FIGS. 3-5, a slam-shut safety device 110 assembled in accordance with the teachings of the present disclosure is shown. The slam-shut safety device 110 may be similar to the slam-shut safety device 10 discussed above with respect to FIGS. 1 and 2, and therefore, the same or similar components will have the same reference numerals, although the reference numerals will be increased by 100. Once again, the slam-shut safety device 110 may be attached to a main regulator (not shown) in a gas distribution system to provide a safety shutoff capability in the event of main regulator failure. As shown in FIG. 3, the slam-shut safety device 110 can include a slam-shut portion 113 and an actuator 115, adapted to be connected to a valve portion 111. The valve portion 111 includes a valve body 112 having a fluid inlet 114 and a fluid outlet 116, with the inlet 114 and the outlet 116 being connected by a fluid passage forming a flow path 118. As shown in FIGS. 3-5, a valve seat 120 is disposed within the valve body 112 and defines a flow orifice 121 forming a portion of the flow path 118. Consequently, fluid flowing through the valve portion 111 flows from the fluid inlet 114, through the flow path 118 including the valve seat 120 (and the flow orifice 121 formed by the valve seat 120) to the fluid outlet 116.

In the depicted version, the slam-shut safety device 110 includes a cage 140 mounted within a throat portion 141 of the valve body 112 for receiving a valve disc 122 of the slam-shut portion 113. Other versions, however, do not include the cage 140, similar to that depicted in FIG. 1.

The slam-shut portion 113 in FIGS. 3-5 includes a slam-shut body 151 and a reset pin 136 slidably disposed in a reset bore 155 of the slam-shut body 151. As shown, the reset pin 136 and reset bore 155 are disposed on a common slam-shut axis A. The slam-shut body 151 further defines a throat portion 153 disposed between the reset bore 155 and the throat portion 141 of the valve body 112. The throat portion 153 of the slam-shut body 151 is connected to the throat portion 141 of the valve body 112. The valve disc 122, which as with the example depicted in FIGS. 1 and 2, cooperates with the valve seat 120 to restrict fluid flow through the slam-shut safety device 110 when an overpressure or underpressure condition is sensed downstream of the main regulator. The valve disc 122 is operably connected to an end 136a of the reset pin 136 such that it shifts along the slam-shut axis A toward the valve seat 120 in order to close the fluid orifice 121 in reaction to actuation of the actuator 115, and further shifts along the slam-shut axis A away from the valve seat 20 in order to open the fluid orifice 121 in reaction to manipulation of the reset pin 136 in a known manner.

Typically, the actuator 115 includes a housing 126 enclosing one or more springs 128, and the springs 128 are typically connected to a diaphragm 130. The diaphragm 130 is sensitive to pressure changes within the actuator 115 and moves within the actuator housing 126 in response to pressure changes. The diaphragm 130 is connected to a back plate 132, which moves longitudinally within the housing 126 in conjunction with the diaphragm 130. The back plate 132 interacts with a cam 134 to engage or release a reset pin 136. The reset pin 136 is shiftable along the slam-shut axis A relative to the valve body 112 between a retracted or untripped position in which the valve disc 122 is spaced away from the valve seat 120 in an open position (FIG. 5) opening the flow orifice 121, and an extended or tripped position in which the valve disc 122 is seated against the valve seat 120 in a closed position (FIGS. 3 and 4) closing the flow orifice 121. The slam-shut portion 113 additionally includes a spring 137 or other suitable biasing mechanism near the end 136a adjacent to the valve disc 122, which acts to bias the valve disc 122 toward the closed position.

Consequently, the reset pin 136, as mentioned, is shiftable along the slam-shut axis A between the untripped position and the tripped position when the actuator 115 senses either an overpressure condition or an underpressure condition. The actuator 115 causes the cam 134 to release the reset pin 136, such that the spring 137 causes the reset pin 136 and hence the valve disc 122 to slide or otherwise shift along the slam-shut axis A toward the valve seat 120, ultimately bringing the valve disc 122 into contact with the valve seat 120, thus closing the flow orifice 121 and shutting off fluid flow through the flow path 118.

Throughout the operation of the device, when the valve disc 122 is in the open position, or another position displaced away from the closed position, fluid flows through the valve body 112 and fluid forces act on the valve disc 122. As discussed above, with respect to FIGS. 1 and 2, such fluid forces can be high enough to deform the structure supporting the valve disc 122 such as the reset pin 36, for example, of the conventional slam-shut safety device 10.

In contrast to the conventional slam-shut safety device 10, however, the slam-shut safety device 110 disclosed with reference to FIGS. 3-5 includes a plug support 160 connected to a guide collar 162. Referring to FIGS. 4 and 5, the plug support 160 of the present version of the slam-shut safety device 110 includes a body portion 164 and a nose portion 166 extending away from the body portion 164. The body portion 164 includes a generally cylindrical form defining a blind bore 168 receiving and connected to the end 136a of the reset pin 136. The nose portion 166 also includes a generally cylindrical form, but with a diameter substantially smaller than a diameter of the body portion 164, and, in the present version, a longitudinal dimension substantially longer than a longitudinal dimension of the body portion 164. As shown, the nose portion 166 extends through a central opening 122a of the valve disc 122. In the disclosed version, a nut 170 is threaded onto an outer surface of the nose portion 166 for retaining the valve disc 122 on the plug support 160.

Additionally, the disclosed version further includes a biasing member 172 disposed between the nut 170 and the valve disc 122 to bias the valve disc away from the nut 170 and into engagement with the body portion 164 of the plug support 160. The biasing member 172 can include a spring such as a wave spring, coil spring, a Belleville washer, a compressible grommet, or any other type of suitable biasing member. As mentioned, the biasing member 172 biases the valve disc 122 against the body portion 164 of the plug support 160. This biasing advantageously prevents any suction created by fluid flowing through the valve body 112 when the valve disc 122 is in the open position, from displacing the valve disc 122 away from the body portion 164 and into the flow path, which can reduce the overall flow are of the flow path. Additionally, however, the biasing member 172 provides sufficient flexibility that the valve disc 122 can float on the nose portion 166 of the plug support 160 to enable the valve disc 122 to properly align itself against the valve seat 120, when in the closed position. While the disclosed version of the slam-shut safety device 110 includes the biasing member 172, other versions of the slam-shut safety device 110 can be constructed without the it.

As best shown in FIGS. 4 and 5, the guide collar 162 of the presently disclosed version of the slam-shut safety device 110 is connected to the plug support 160 and includes a hollow cylindrical portion 174 extending at least partly over the reset pin 136. More specifically, in the present version, a first end 162a of the guide collar 162 is threadably connected to the body portion 164 of the plug support 160. In other versions, instead of a threaded connection the guide collar 162 can be connected to the plug support 164 by a weld joint, a friction fit joint, a pinned joint, an adhesive joint, a fastener connection, or any other suitable means. While the guide collar 162 and plug support 160 thus far has been described as separate component connected together, in other versions, the guide collar 162 and the plug support 160 could be integrally formed as one-piece.

With continued reference to FIGS. 4 and 5, the guide collar 162 is slidably disposed in the throat portion 153 of the slam shut body 151. More specifically, the slam-shut safety device 110 defines a guide bore 176, in which the guide collar 162 is slidably disposed. In the version of the slam-shut body 151 depicted in FIGS. 3-5, the guide bore 176 is carried by a sleeve insert 178 fixed in the throat portion 153 of the slam-shut body 151 because the guide bore 176 must be cylindrical in form, while the existing throat portion 153 defines a tapered conical opening. In other versions, however, the slam shut body 151 can be formed or machined, for example, such that the guide bore 176 is formed directly in the slam shut body 151. In such a version, no sleeve insert 178 is required.

With the slam-shut safety device 110 constructed as described above, it can be seen that the guide collar 162 is shiftable along the slam-shut axis A in generally the same manner that the valve disc 122 and reset pin 136 are. That is, the guide collar 162 is shiftable along the slam-shut axis A between a retracted position, as shown in FIG. 5, wherein the valve disc 122 is in the open position, and an extended position, as shown in FIG. 4, when the valve disc 122 is in the closed position. In the retracted position, a majority of the guide collar 162 is disposed inside of the guide bore 176. In this position, any fluid forces generated in the valve body 112 and acting on the valve disc 122 are transferred to the guide collar 162 via the plug support 160, and ultimately borne by the throat portion 153 of the slam-shut body 151. Similarly, when displaced away from the retracted position toward the extended position, any fluid forces present in the valve body 112, for example prior to the valve disc 122 reaching the closed position, are transferred to the guide collar 162 via the plug support 160, and ultimately borne by the throat portion 153 of the slam-shut body 151. Thus, it can be appreciated that the guide collar 162 in combination with the other disclosed features effectively transfers fluid forces away from the reset pin 136, thereby maximizing the strength, integrity, and useful life of the slam-shut safety device 110.

To assist with facilitating displacement of the guide collar 162 relative to the guide bore 176, the version of the guide collar 162 depicted in FIGS. 3-5 can further include a plurality of guide ribs 180 disposed between the guide collar 162 and an inner wall 176a of the guide bore 176 to reduce the shear friction that might otherwise exist between these surfaces. In the version in FIGS. 3-5, the plurality of guide ribs 180 include first and second circumferential guide ribs 182a, 182b carried by an outer surface 184 of the guide collar 162 and centered on the slam-shut axis A. Moreover, the circumferential guide ribs 182a, 182b are spaced axially along the guide collar 162. So configured, the first circumferential guide rib 182a is positioned near the first end 162a of the guide collar 162 and the second circumferential rib 182b is positioned near a second end 162b of the guide collar 162. In this manner, both the first and second circumferential ribs 182a, 182b reside in contact with the inner wall 176a of the guide bore 176 when the valve disc 122 is in the open position and the guide collar 162 is in the retracted position, as shown in FIG. 5. Accordingly, when in the retracted position, each of the first and second circumferential ribs 182a, 182b lend to transferring fluid forces acting on the valve disc 122 to the throat portion 153 of the slam-shut body 151. In contrast, when the valve disc 122 is the closed position and the guide collar 162 is in the extended position, as shown in FIGS. 3 and 4, the first circumferential rib 182a is disposed outside of the guide bore 176 toward the valve seat 120, while the second circumferential rib 182b remains in contact with the inner surface 176a of the guide bore 176. Accordingly, when in the extended position, only the second circumferential rib 182b lends to transferring fluid forces acting on the valve disc 122 to the throat portion 153 of the slam-shut body 151.

In addition to the plurality of guide ribs 180, the present version of the slam-shut safety device 110 further includes one or more openings 186 in the plug support 160. The one or more openings 186 provide fluid communication between the flow path in the valve body 112 and an interior chamber 188 of the guide collar 162. So configured, the one or more openings 186 facilitate the movement of the guide collar 162 between the retracted and extended positions by allowing fluid to freely pass between the interior chamber 188 and the flow path. For example, when moving from the extended position (FIG. 4) to the retracted position (FIG. 5), fluid collected in the interior chamber 188 is exhausted out of the one or more openings 186. In contrast, when moving from the retracted position (FIG. 5) to the extended position (FIG. 4), fluid passes through the one or more openings 186 to fill the interior chamber 188.

Figure 6:
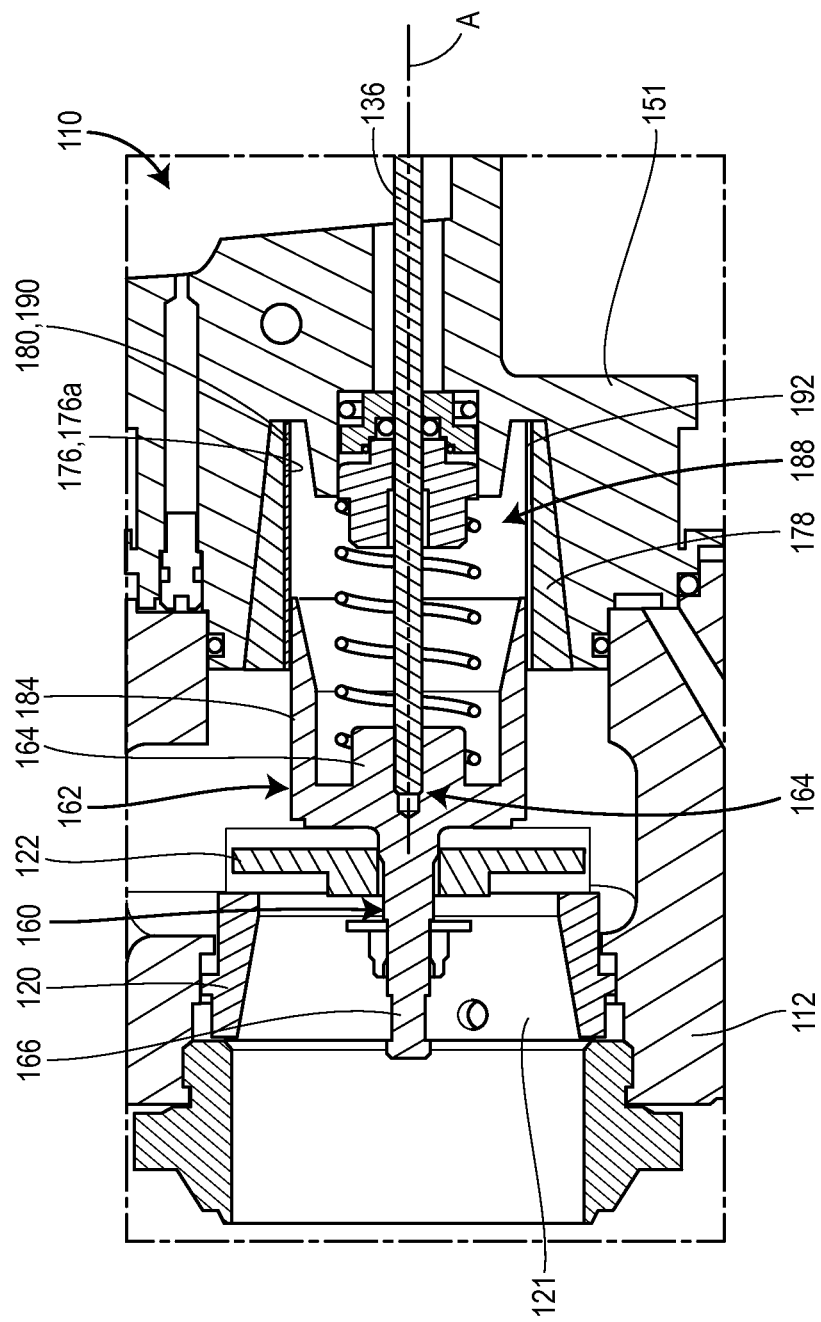
FIG. 6 is an enlarged cutaway view of the slam-shut safety valve of FIG. 3, showing an alternative version of the guided plug support of the present disclosure.

As mentioned above, an alternative version of the slam-shut safety device 110 of FIGS. 3-5 can include the plug support 160 and the guide collar 162 constructed as one-piece. One example of such an alternative version is depicted in FIG. 6. For the sake of description only, the alternative version of the slam-shut safety device 110 depicted in FIG. 6 also includes an alternative arrangement of the plurality of guide ribs 180 disposed between the guide collar 162 and the inner wall 176a of the guide bore 176.

Specifically, in the version depicted in FIG. 6, the plurality of guide ribs 180 include a plurality of longitudinal guide ribs 190 carried by the inner wall 176a of the guide bore 176 and spaced circumferentially around the guide collar 162, and therefore, also spaced circumferentially around the slam-shut axis A. The outer wall 184 of the guide collar 162 in this version is cylindrical such that a plurality of longitudinal channels 192 (e.g., voids) are defined between the plurality of longitudinal ribs 190 and spaced circumferentially about the guide collar 162 and, therefore, also the slam-shut axis A. The channels 192 provide for fluid communication between the interior chamber 188 of the guide collar 162 and the flow path of the valve body 112 to facilitate movement of the guide collar between the extended and retracted positions in a manner similar to that described above with respect to the one or more openings described with reference to FIGS. 3-5. As such, in this version, the plug support 164 can optionally be provided without the one or more openings 186. While the version of the slam-shut safety device 110 depicted in FIG. 6 includes the longitudinal guide ribs 190 carried by the inner wall 176a of the guide bore 176 and the outer surface 184 of the guide collar 162 is a smooth cylinder, the slam-shut safety device 110 can alternatively include the longitudinal ribs 190 carried by the outer wall 184 of the guide collar 162 and the inner wall 176a of the guide bore 176 can be a smooth cylinder.

From the foregoing, it should be appreciated that the disclosed configuration of a slam-shut safety device 110 advantageously minimizes the effects of fluid transfer on the operation and movement of the valve disc 122 and maintains the structural integrity of the reset pin 136 by deflecting forces to be borne by the slam shut body 151, which would otherwise be at least partly borne by the reset pin 136 itself. This construct therefore maintains the intended functionality and maximizes the useful life of the slam-shut safety device 110. Therefore, it can be understood that any version of the guide collar described herein being guided by and bearing against the guide bore to transfer the forces in the described manner can be referred to as a means coupled to the plug support for protecting the reset pin against detrimental effects of fluid forces generated in the valve body adjacent to the valve disc.

While certain representative versions of slam-shut devices and details have been described herein for purposes of illustrating the invention, it will be apparent to those skilled in the art that various changes in the devices disclosed may be made without departing from the spirit and scope of the invention, which is defined by the following claims and is not limited in any manner by the foregoing description.

What is claimed:
1. A slam-shut safety device, comprising:
   a valve body, the valve body having an inlet, an outlet, and defining a flow path extending between the inlet and the outlet, the valve body including a valve seat surrounding an orifice disposed between the inlet and the outlet;
   a valve disc, the valve disc disposed within the valve body and shiftable along a slam-shut axis between an open first position in which the valve disc is spaced away from the valve seat, and a closed second position in which the valve disc is seated against the valve seat;
   a reset pin operatively coupled to the valve disc and shiftable along the slam-shut axis relative to the valve body between an untripped position placing the valve disc in the open first position and a tripped position placing the valve disc in the closed second position, the reset pin arranged to respond to an actuator to shift the reset pin from the untripped position toward the tripped position;

a plug support connected between the valve disc and the reset pin;

a guide collar connected to the plug support and including a hollow cylindrical portion extending at least partly over the reset pin at a location adjacent to the valve disc, the guide collar slidably disposed in a guide bore of a slam shut body that is connected to the valve body and supporting the reset pin, the guide collar shiftable along the slam-shut axis between a retracted position, wherein a majority of the guide collar is disposed inside of the guide bore when the valve disc is in the open position, and an extended position, wherein the majority of the guide collar is disposed outside of the guide bore when the valve disc is in the closed position, the guide collar in contact with an inner wall of the guide bore for providing added structural integrity;

a plurality of guide ribs disposed between the guide collar and the guide bore, the guide ribs carried by one of the guide collar or the inner wall of the guide bore; and a plurality of longitudinal channels disposed between the guide collar and the guide bore and parallel to the slam-shut axis and defined between the plurality of guide ribs, the longitudinal channels providing fluid communication between the flow path and an interior chamber of the guide collar to facilitate venting of the interior chamber when the guide collar shifts between the retracted and extended positions.

2. The device of claim 1, wherein the plurality of guide ribs include a plurality of longitudinal guide ribs disposed parallel to the slam-shut axis and spaced circumferentially about the guide collar.

3. The device of claim 2, wherein the plurality of longitudinal guide ribs are carried by the inner wall of the guide bore.

4. The device of claim 2, wherein the plurality of longitudinal guide ribs are carried by the guide collar and formed on a circumferential outer wall of the guide collar.

5. The device of claim 1, wherein the plurality of guide ribs include a plurality of circumferential guide ribs centered on the slam-shut axis and spaced axially along the guide collar.

6. The device of claim 5, wherein the plurality of circumferential guide ribs are carried by a circumferential outer wall of the guide collar.

7. The device of claim 5, further comprising one or more openings formed in the plug support and providing fluid communication between the flow path and an interior chamber of the guide collar to facilitate venting of the interior chamber when the guide collar shifts between the retracted and extended positions.

8. The device of claim 1, wherein the guide collar is connected to the plug support by a fixation device including one or more of the following: a threaded connection, a weld joint, a friction fit joint, a pinned joint, an adhesive joint, a fastener connection.

9. The device of claim 1, wherein the plug support and guide collar are one-piece.

10. A slam-shut safety device, comprising:

a slam shut body including a throat portion adapted to be connected to a valve body;

a reset pin supported by the slam-shut body and extending out of the throat portion, the reset pin being shiftable along the slam-shut axis between an untripped position retracted into the slam-shut body and a tripped position extended out of the slam-shut body relative to the retracted position, the reset pin arranged to respond to an actuator to shift the reset pin from the untripped position toward the tripped position;

a valve disc operatively coupled to an end of the reset pin outside of the throat of the slam-shut body, the valve disc adapted to be disposed within the valve body when the slam-shut body is connected to the valve body, the valve disc shiftable along the slam-shut axis between an open first position when the reset pin is in the untripped position, and a closed second position when the reset pin is in the tripped position;

a plug support connected between the valve disc and the reset pin;

a guide collar connected to the plug support and including a hollow cylindrical portion extending at least partly over the reset pin at a location adjacent to the valve disc, the guide collar slidably supported by a guide bore defined by the throat portion of the slam shut body, the guide collar shiftable along the slam-shut axis between a retracted position, wherein a majority of the guide collar is disposed inside of the guide bore when the reset pin is in the untripped position, and an extended position, wherein the majority of the guide collar is disposed outside of the guide bore when the reset pin is in the tripped position, the guide collar in contact with an inner wall of the guide bore for providing added structural integrity;

a plurality of guide ribs disposed between the guide collar and the guide bore, the guide ribs carried by one of the guide collar or the inner wall of the guide bore; and a plurality of longitudinal channels disposed between the guide collar and the guide bore and parallel to the slam-shut axis and defined between the plurality of guide ribs, the longitudinal channels providing fluid communication between the flow path and an interior chamber of the guide collar to facilitate venting of the interior chamber when the guide collar shifts between the retracted and extended positions.

11. The device of claim 10, wherein the plurality of guide ribs include a plurality of longitudinal guide ribs disposed parallel to the slam-shut axis and spaced circumferentially about the guide collar.

12. The device of claim 11, wherein the plurality of longitudinal guide ribs are carried by the inner wall of the guide bore.

13. The device of claim 11, wherein the plurality of longitudinal guide ribs are carried by the guide collar and formed on a circumferential outer wall of the guide collar.

14. The device of claim 10, wherein the plurality of guide ribs include a plurality of circumferential guide ribs centered on the slam-shut axis and spaced axially along the guide collar.

15. The device of claim 14, wherein the plurality of circumferential guide ribs are carried by the guide collar and formed on a circumferential outer wall of the guide collar.

16. The device of claim 14, further comprising one or more openings formed in the plug support and providing fluid communication between the flow path and an interior chamber of the guide collar to facilitate venting of the interior chamber when the guide collar shifts between the retracted and extended positions.

17. The device of claim 10, wherein the guide collar is connected to the plug support by a fixation device including one or more of the following: a threaded connection, a weld joint, a friction fit joint, a pinned joint, an adhesive joint, a fastener connection.

18. The device of claim 10, wherein the plug support and the guide collar are formed as one-piece.

19. A slam-shut safety device, comprising:

a valve body, the valve body having an inlet, an outlet, and defining a flow path extending between the inlet and the outlet, the valve body including a valve seat surrounding an orifice disposed between the inlet and the outlet;

a valve disc, the valve disc disposed within the valve body and shiftable along a slam-shut axis between an open first position in which the valve disc is spaced away from the valve seat, and a closed second position in which the valve disc is seated against the valve seat;

a reset pin operatively coupled to the valve disc and shiftable along the slam-shut axis relative to the valve body between an untripped position placing the valve disc in the open first position and a tripped position placing the valve disc in the closed second position, the reset pin arranged to respond to an actuator to shift the reset pin from the untripped position toward the tripped position;

a plug support connected between the valve disc and the reset pin; and a first means coupled to the plug support for protecting the reset pin against detrimental effects of fluid forces generated in the valve body adjacent to the valve disc, the first means comprising a plurality of guide ribs; and a second means providing fluid communication between the flow path and an interior chamber of the first means when the valve disc shifts between the open first position and the closed second position, the second means defined by the guide ribs of the first means.

* * * * *